Feb. 28, 1967 J. MOZIEK 3,306,445
METHOD AND APPARATUS FOR UNLOADING PLATES AND FRAMES
Filed Nov. 18, 1963 4 Sheets-Sheet 1
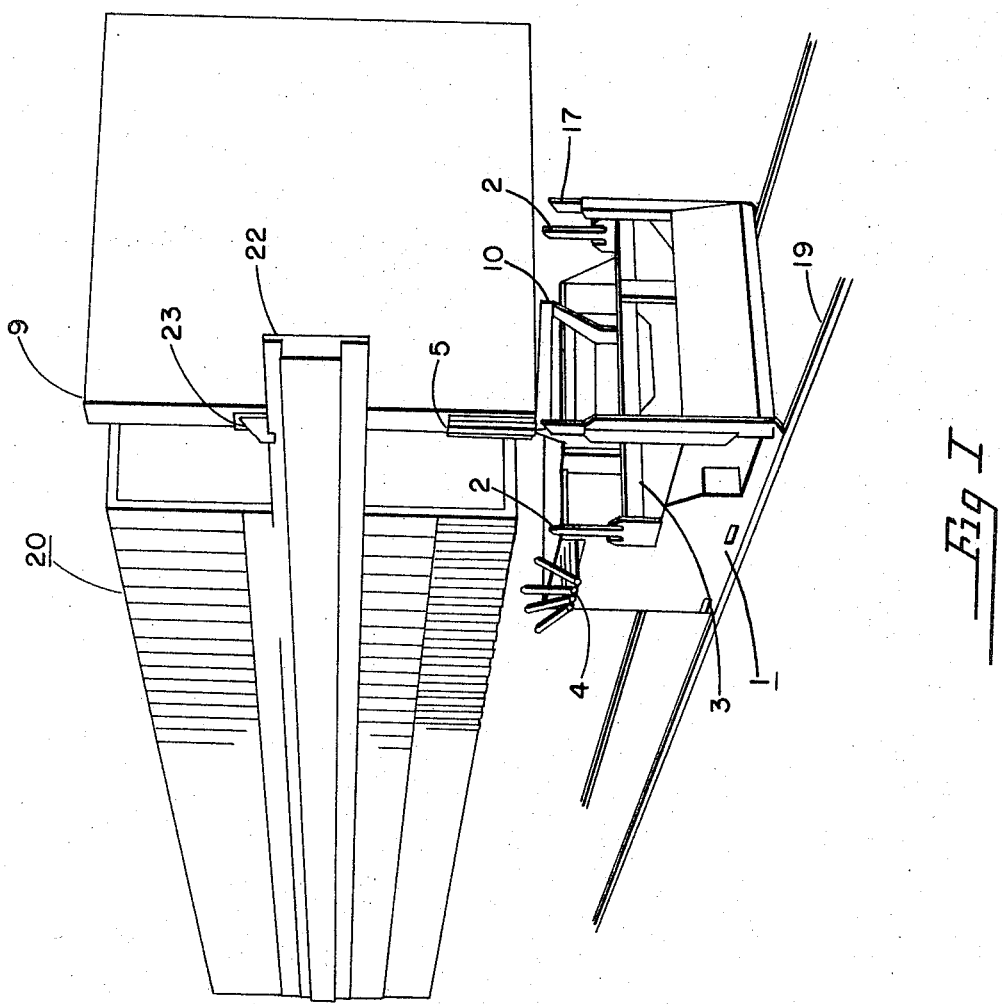
Fig I
JOHN MOZIEK INVENTOR
BY
*Paul E Sullivan*
ATTORNEY Feb. 28, 1967  J. MOZIEK  3,306,445
METHOD AND APPARATUS FOR UNLOADING PLATES AND FRAMES
Filed Nov. 18, 1963  4 Sheets-Sheet 2
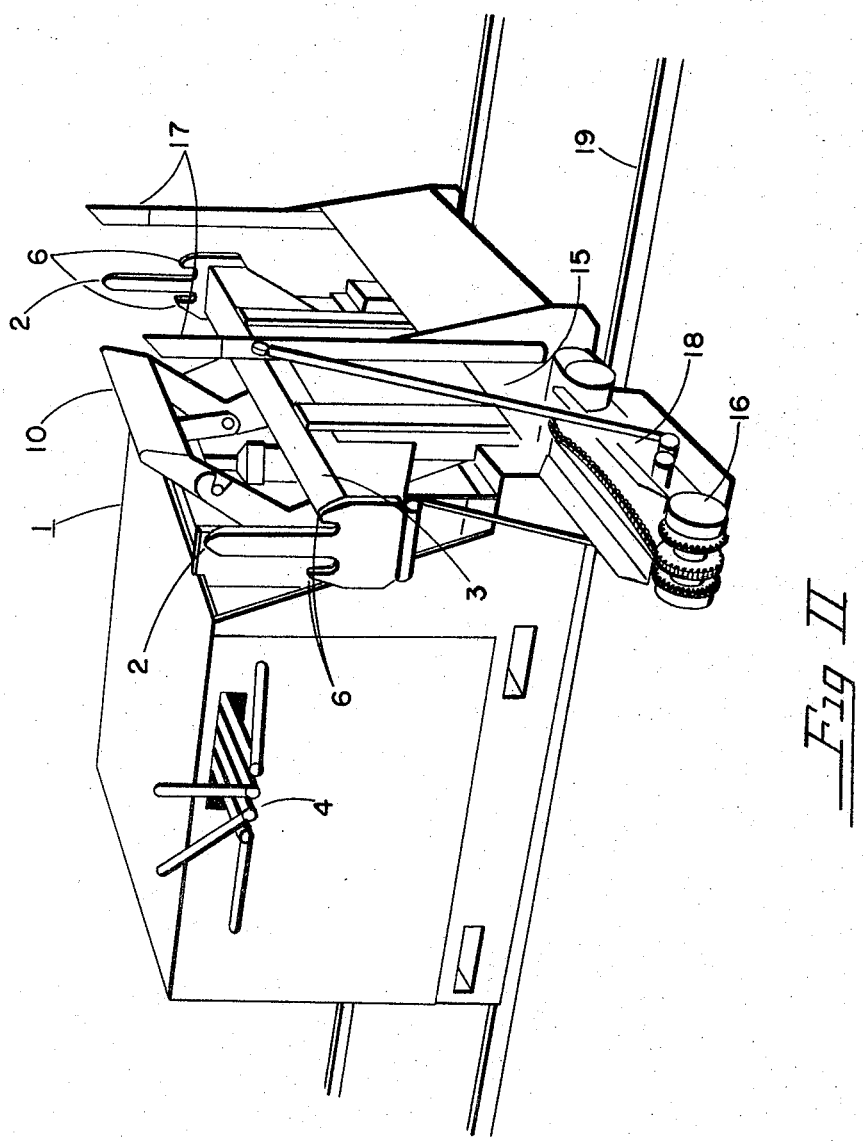
Fig II
JOHN MOZIEK INVENTOR.
BY
ATTORNEY

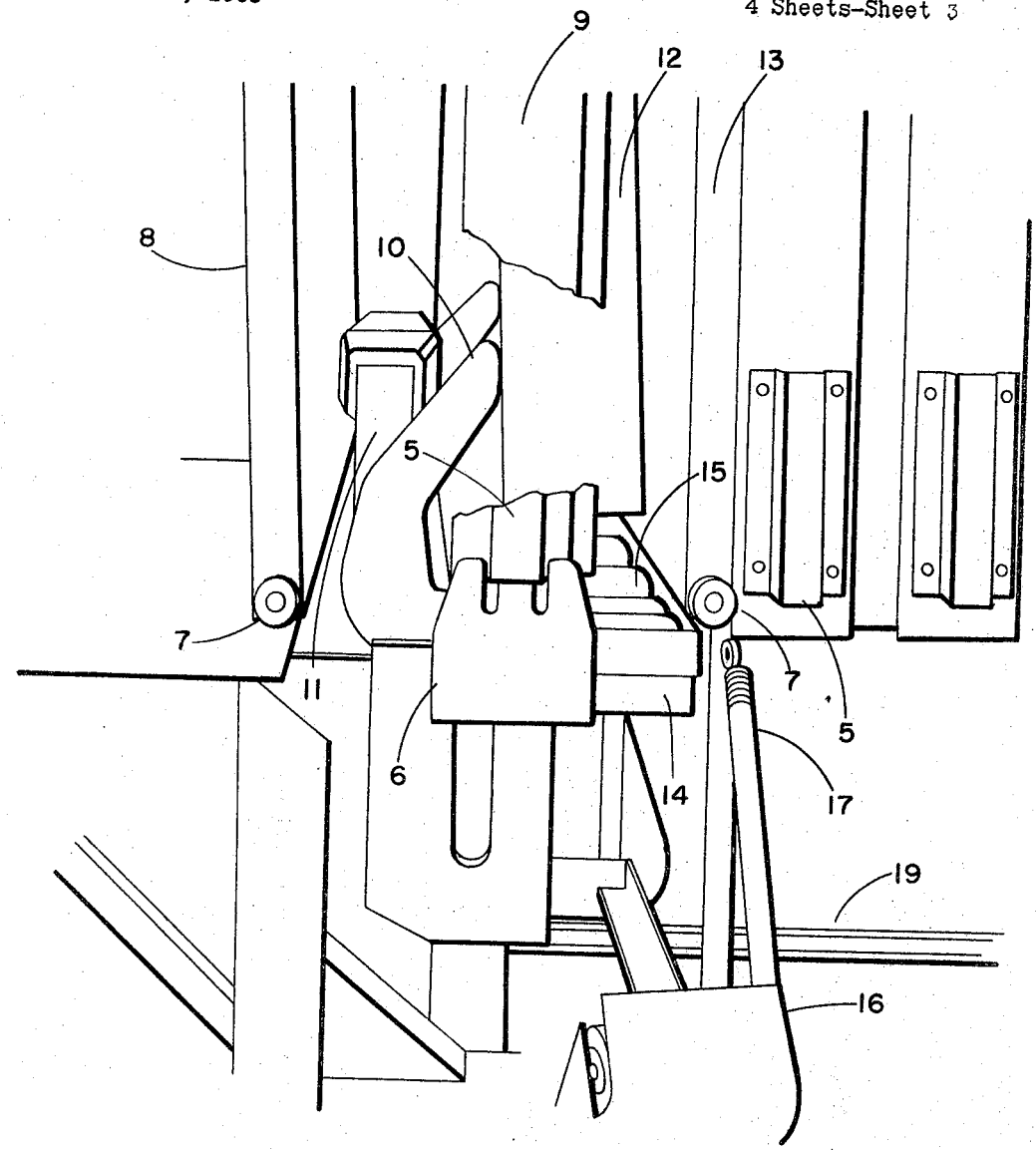
Fig III
JOHN MOZIEK INVENTOR.
BY
ATTORNEY

Feb. 28, 1967 J. MOZIEK 3,306,445
METHOD AND APPARATUS FOR UNLOADING PLATES AND FRAMES
Filed Nov. 18, 1963 4 Sheets-Sheet 4
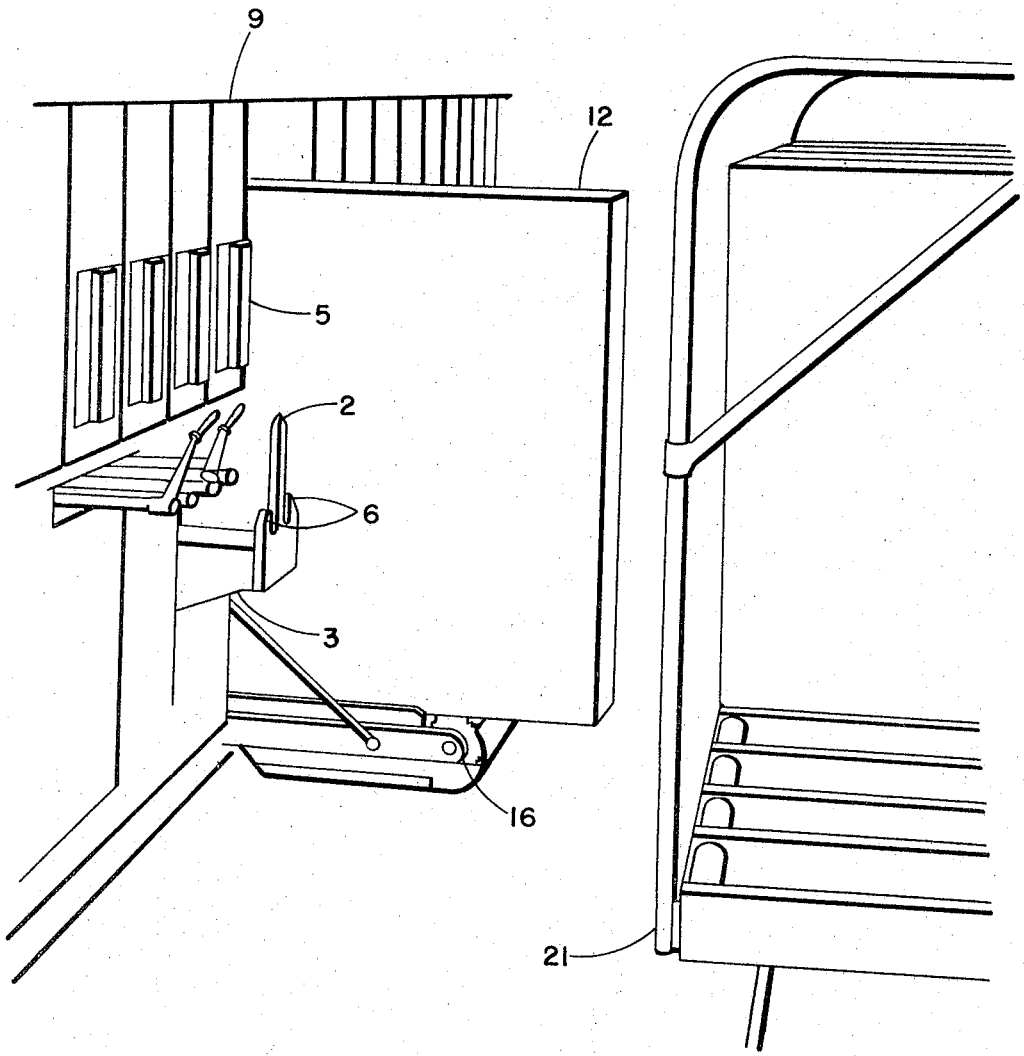
Fig IV
JOHN MOZIEK INVENTOR.
BY
*Paul Sullivan*
ATTORNEY

United States Patent Office 3,306,445
Patented Feb. 28, 1967

3,306,445
METHOD AND APPARATUS FOR UNLOADING PLATES AND FRAMES
John Moziek, South Hadley, Mass., assignor to Monsanto Company, St. Louis, Mo., a corporation of Delaware
Filed Nov. 18, 1963, Ser. No. 324,507
8 Claims. (Cl. 210—67)

The present invention relates generally to a new and useful method and apparatus for unloading plate and frame equipment and more specically to a method and apparatus for automatically unloading presses of the plate and frame type.

A problem has existed for many years in the use of plate and frame type equipment due to the cumbersome and time consuming methods available for unloading the contents of the frames upon completion of the processing cycle. The methods presently employed have required elaborate safety precautions as well as inordinate manpower and loading time requirements in order to unload a product from the frames in a manner suitable for ordinary commercial production lines. For example, it has often been necessary to have several operators manually release the platens from the adjacent frame, and by the use of brute force, jar the product loose from the confines of the frame. The hazards inherent in such an operation are obvious.

The present invention, in addition to obviating these numerous deficiencies in the prior art, has provided the industry with an automatic plate and frame unloading device, to be described in further detail, which provides not only an increased safety factor, but in addition requires only half the unloading time and is capable of being operated by a single operator, thus decreasing the required process cycle times and facilitating the unloading operation in general. These economies in time and manpower are accomplished by the use of an automatic unloading machine which, in a single operation, engages the frame, disengages the adjacent platens, dislodges the product from the frame, and automatically conveys the product away from the confines of the press. It is thus possible to advance this apparatus along a series of sequential frames, unloading each one in a similar manner, without the necessity of stopping to manually remove the product from the frame during the unloading operation.

It is therefore a primary object of this invention to provide a new and useful apparatus for automatically unloading plate and frame type equipment comprising bracing means for engaging the frame and ejection means for forcibly dislodging the contents of the frame.

It is a further object of this invention to provide an apparatus which will, in a single continuous operation, automatically unload a series of horizontally sequentially arranged plates and frames, comprising vertically movable bracing means for simultaneously engaging the frame and separating the frame from its adjacent plates; ejection means associated with the bracing means which are adapted to dislodge the contents of the frame upon being driven into contact with the contents, and receiving means positioned below the ejection means for receiving the contents of the frame upon its ejection from the frame.

It is a still further object of this invention to provide a method for automatically removing the contents of a plate and frame type press comprising the steps of positioning a bracing means for engaging a frame in proximity to the frame, automatically advancing the bracing means into abutting relationship with the frame, and driving an ejector into contact with the contents of the frame, thereby dislodging the contents from the confines of the frame.

It is a further object of this invention to provide the art with a new and useful unloading apparatus which will unload apparatus of the plate and frame type in a safe, economical manner.

It is a still further object of this invention to provide a method for unloading a plate and frame type apparatus which will permit the use of lower production press cycle times.

These and other objects of the invention will become apparent from the following description when read in connection with the accompanying drawings which show a prefered embodiment of the invention.

In the drawings:

FIGURE 1 is a perspective drawing showing the unloading device in operating position prior to unloading of a plate and frame type press.

FIGURE 2 is a perspective view of the apparatus positioned on an inverted V-track.

FIGURE 3 is a fragmentary perspective view in partial section taken through the frame showing removal of the frame contents.

FIGURE 4 is a perspective view showing the operation of the attached conveyor bridge.

Referring now to the drawings in more detail and particularly to FIGURES 2 and 3, the unloading apparatus, designated 1, is shown in detail. One of the principal functional components of the apparatus consists of a set of prongs 2, joined by a crossbar 3, the crossbar being attached to a suitable drive mechanism providing movement of the crossbar in a vertical direction by manipulation of levers 4. This bracing component, when in operation, is advanced horizontally in forward or reverse direction beneath the frames and brought into position by raising the crossbar 3 until it engages frame sockets 5, shown in FIGURE 3, attached to opposite ends of each frame. The frame sockets are flared slightly at the lower end to facilitate engagement with the prongs as the prongs are brought vertically into position. Adjacent each side of prongs 2 and integral therewith are platen releases 6. These platen releases, when in operation, move into sliding engagement with the periphery of cam buttons 7 which are attached to the outer panels of platens 8, thus imparting the desired movement to the platens. As crossbar 3 is driven vertically upward, prongs 2 engage frame sockets 5 while platen releases 6 simultaneously move into sliding contact with the periphery of cam buttons 7, thus forcing platens 8 laterally away from frame 9 as prong 2 is driven up into position. Crossbar 3 is raised vertically to a height sufficient to impart a vertical shearing action between the frame and platens, whereby releasing the platen to frame bond at the upper extremities of the frame.

Crossbar 3, as well as the entire unit, may be driven hydraulically or by any other suitable means. Platen release 6 need not necessarily be integral with prong 2 though this arrangement has obvious advantages in fabricating the components. Positioned between prongs 2 and adjacent crossbar 3 is a "knock-out bar" 10, linked to a tie bar 11. These bars are driven by any suitable means such that upon actuating the tie bar 11, knock-out bar 10 will be advanced transversely above crossbar 3. Bar 10 need not necessarily be a bar as such. A large planar surface which would be capable of dislodging a material having characteristics such that a bar would not satisfactorily remove the frame contents could be substituted therefor in certain useful applications. For example, a large planar surface attached to knock-out bar 10 would be more suitable for a material which tended to crumble upon being subjected to a shearing force of any magnitude.

By raising prongs 2 into frame sockets 5, frame 9 is maintained in a rigid position while platens 8 and 13 are disengaged from frame 9. The unloader may then be shifted backward and forward horizontally, removing the disengaged platen and allowing knock-out bar 10 access to the product. Knock-out bar 10 is then automatically advanced into the confines of the frame, forcing cake 12 out of the frame and into receiving means 14. Receiving means 14 may be raised into position at any time prior to removal of the cake from frame 9. This is most conveniently accomplished by raising receiving means 14 simultaneously with that of crossbar 3 at a faster elevation speed. Receiving means 14 may comprise any suitable conveyance mechanism such as a series of rollers 15 capable of transferring cake 12 from the frame to bridge 16. Bridge 16 is positioned adjacent to receiving means 14 and consists of a chain-driven device for transferring the cake to a storage unit. The angle of impact between the knock-out bar 10 and the cake 12 contained within the frames will vary depending upon the particular material within the confines of the frame. In addition, although the particular embodiment exemplified herein utilizes a pair of prongs to engage each side of a frame, any other mating device capable of holding the frame intact while the contents are forced out could be utilized. For example, a V-channel could be used in place of a frame socket, or a projection could be driven vertically downward or even horizontally into locking position with the frame. Additionally, the male member of the locking mechanism could obviously be attached to the frame, and the female member attached to the crossbar. Generally, any male-female combinations could be employed.

Obviously, receiving means 15 with accompanying bridge 16, although useful for removal of any material which remains intact upon being dislodged by knock-out bar 10, would not be suitable on any material which tended to fracture and break upon being dislodged. In this event, a hopper and suitable conveyor or chute can be used in lieu of the receiving means and bridge shown herein. In fact, it is unnecessary to provide any chute or conveyor means at all, as shown in the unloading device of FIGURE 1. In some instances it may be desirable to merely unload the frames and allow the contents to drop beneath the frames to a carrier or directly into a storage bin, crusher, or the like located beneath the plate and frame equipment.

Guide rails 17 are provided in proximity to knockout bar 10 to guide the cake 12 onto receiving means 14 as it is released from frame 9. Again, in the case of a material incapable of remaining intact upon release from the frame, these guide rails could be replaced by a solid sheet, a chute, or a conveyor for guiding the material onto a receiver. Bridge 16 is attached to the apparatus by a spring device 18 or the like. The bridge may be raised or lowered automatically or the weight of the slab itself can be used to lower the bridge. In addition, the bridge 16 may be reversed to either side of receiving means 15. The entire apparatus is operated by control levers adjoining the apparatus; however, it would be within the scope of this invention to control the movement of the prongs and related equipment remotely if it were so desired. Such an operation would increase the safety factor even further. In fact, the entire unloading operation may be programmed to eliminate the human element entirely.

The entire mechanism may be driven by any suitable means. Though the present apparatus is driven hydraulically, this is by no means essential, and the individual elements could be actuated as effectively electrically or by any other system.

Referring to FIGURE 1, the entire apparatus is shown positioned along an inverted V-track 19. The inverted V-track is aligned with filter press 20 such that prongs 2 upon being advanced horizontally into position are in alignment with frame sockets 5. The unloading apparatus is then advanced along the entire series of frames and platens and each frame is unloaded in succession. Cog wheels with an accompanying cog track would be used where greater traction is required.

The unloading apparatus described and claimed herein can be employed in most commercially available presses by making minor modifications in the press assembly. It is only necessary to provide most conventional presses with an appropriate mating device on the individual frames. In addition, this apparatus may serve any number of presses depending upon the individual cycle times for each press. It is simply necessary to stagger the press cycle times so that the apparatus will be unloading one press while a second press is still in operation. Upon completion of the unloading operation, the apparatus can be readily moved into position to unload a second press upon completion of its cycle. Due to the extremely short period necessary to unload large presses, a few of these unloading devices are capable of servicing a full-scale production pressroom containing a multitude of presses. The unloading apparatus may also, if desired, be made a permanent integral part of the press, though this would obviate the economical advantages of the portable type of unloader.

Although the unloading apparatus is illustrated in combination with a plate and frame type press, one skilled in the art would readily conceive numerous other applications for the device. For example, in addition to being useful in any filter press operation, this unloader finds utility in sand casting or molding operations, or in any operation requiring the disengagement of a sealed chamber and removal of a product contained within the chamber.

Referring now to FIGURE 4, bridge mechanism 16 is shown as it removes a cake 12 from the confines of the press and transfers the cake to an adjacent rack 21. As can be readily seen from the drawing, the cake is transferred completely automatically from the frame to an adjoining rack without the necessity of any additional operators. It is, of course, within the scope of this invention to transfer the cake to any other device such as, for example, a crusher, conveyor, or the like.

The following example is presented as an illustration, but is not intended to be a limitation of the above-described invention, in order to more clearly illustrate the novel features of this invention:

A charge of partially polymerized styrene was fed into a frame and plate type press 20 and polymerization was completed in the conventional manner. Upon completion of the polymerization cycle, the unloading apparatus was positioned along inverted V-track 19 and advanced beneath the first frame in the sequence of frames and plates. The unloader was advanced horizontally until prongs 2 were in alignment with frame socket 5, and then raised vertically upward into frame sockets 5, thereby simultaneously moving platen releases 6 into sliding contact with cam buttons 7, and disengaging platens 8 and 13 from frame 9. Receiving means 14 was simultaneously brought up into position to receive cake 12 while crossbar 3 was advanced slightly vertically upward, raising frame 9 to allow a slight clearance of the brackets 23 above press tie rails 22. The unloader was retracted horizontally away from platen 13, moving frame 8 sufficiently backward to prevent interference with the movement of ejection bar 10. Ejection bar 10 was raised vertically into position and advanced transversely above crossbar 8 through frame 9, forcing the cake 12 out of the frame and onto receiving means 15. The unloader was retracted horizontally to shift the frame and platen to the rear of the press, receiving means 15 was lowered to its original position and the cake transferred to bridge 14 which conveyed the cake from the apparatus. Crossbar 3 was thereafter advanced horizontally forward in alignment with the next frame socket 5 and the operation continued through the entire series of frames. Upon completion of the unloading operation, the unloading apparatus was removed from track 19 and transferred to another press nearing completion of its polymerization cycle.

While in the foregoing specification, I have set out specific structures and steps in considerable detail for the purpose of illustrating the invention, it will be understood that such details of structure and procedure may be varied widely by those skilled in the art without departing from the spirit of this invention.

What is claimed is:

1. A portable apparatus for automatically unloading a series of horizontally sequentially arranged plates and frames comprising vertically movable bracing means for simultaneously engaging a frame and separating the frame from its adjacent plates, ejection means associated with said bracing means, said ejection means being adapted to dislodge the contents of said frame upon being driven into contact with said contents, and receiving means positioned below said ejection means and said bracing means for receiving the contents of said frame upon its ejection from said frame.

2. A portable apparatus according to claim 1 including drive means for guiding said apparatus along a predetermined path thereby enabling said apparatus to unload a series of frames in sequence.

3. An apparatus according to claim 1 wherein said ejection means includes a planar surfaced bar adapted to be advanced transversely of said bracing means.

4. An apparatus according to claim 1 wherein said bracing means includes means for mating with said frame thereby securing said frame in a rigid position and cam means integral with said means for mating with said frame, adapted to disengage said plate from said frame.

5. An apparatus according to claim 1 wherein said receiving means includes guide means connected thereto for guiding the contents of said frame into said receiving means upon ejection from said frame.

6. An apparatus according to claim 1, wherein said receiving means includes a bridge connected thereto for conveying said contents away from said frame.

7. A method of automatically unloading a series of horizontally sequentially arranged plates and frames comprising:

advancing a vertically movable bracing means along a predetermined path below one of said frames, automatically raising said bracing means into engagement with said frame while simultaneously separating the frame from its adjacent plates, advancing an ejector between the plate and the frame and automatically driving said ejector into contact with the contents in said frame, thereby dislodging said contents from the confines of the frame.

8. A method according to claim 7 including the step of guiding the ejected contents into a receiving means positioned below the frame.

References Cited by the Examiner

UNITED STATES PATENTS

| | | | |
|---|---|---|---|
| 643,022 | 2/1900 | Wilson | 210—225 |
| 644,124 | 2/1900 | Bradley | 210—225 |
| 1,767,318 | 6/1930 | Shaw | 210—230 X |
| 1,889,225 | 11/1932 | Sperry | 210—225 |
| 2,512,365 | 6/1950 | Muller | 210—225 |

REUBEN FRIEDMAN, *Primary Examiner.*

J. DE CESARE, *Assistant Examiner.*